Dec. 25, 1973  TATSUO KAMIJO ET AL  3,781,407
INERT GAS SYSTEM FOR A TANKER

Filed Oct. 4, 1971  2 Sheets-Sheet 1

INVENTORS
Tatsuo Kamijo
Densuke Nagakura
BY
Kelman and Berman
AGENTS

United States Patent Office 3,781,407
Patented Dec. 25, 1973

3,781,407
INERT GAS SYSTEM FOR A TANKER
Tatsuo Kamijo and Densuke Nagakura, Yokohama, Japan, assignors to Mitsubishi Kakoki Kaisha, Tokyo, Japan
Filed Oct. 4, 1971, Ser. No. 186,004
Claims priority, application Japan, Feb. 24, 1971, 46/8,617
Int. Cl. C01b 17/00
U.S. Cl. 423—242
8 Claims

ABSTRACT OF THE DISCLOSURE

An inert gas for flooding compartments or other oil containers of a tanker or other vessel is produced by stripping flue gas of its $SO_2$ content with an aqueous sodium hydroxide or sodium carbonate solution in a scrubber, and oxidizing the resulting sodium sulfite in the solution with atmospheric oxygen in the same scrubber, whereupon a sodium sulfate solution is obtained which may be discharged overboard without damage to marine life.

---

This invention relates to an inert gas system for a tanker or other seagoing vessel, and particularly to a method of producing an inert gas for such a system, and to apparatus for performing the method.

When the gas phase above the oil level in tankers carrying crude oil consists of approximately 2 to 10% hydrocarbons, the balance being air, the mixture is explosive. To prevent explosions, it has been common practice either to blow air into the oil containing spaces at a rate sufficient to prevent the lower hydrocarbon limit from being reached, or to hold the oxygen in the oil containers at a safe low value. It has been found that an oxygen concentration of less than 5% is acceptable.

Large tankers of the type employed for transporting crude oil usually employ the engine exhaust or other combustion gases from the propulsion machinery, hereinafter referred to as "flue gas," as a relatively inert atmosphere for the oil containers. On smaller ships, particularly those carrying a cargo other than crude oil and employing fuel other than such oil, special burners may be provided for producing a suitable flue gas.

The fuels whose combustion provides the flue gas invariably contain enough sulfur to cause severe corrosion damage if the sulfur dioxide bearing flue gas is admitted to the oil containers. The crude gas is therefore scrubbed with sea water which absorbs much of the sulfur dioxide and any sulfur trioxide present, passed through a packed column for removal of entrained mist of the scrubbing liquid, and then used for flooding the container which is to be provided with an inert atmosphere.

The flue gas normally enters the scrubber at a temperature of 150° to 400° C., and is cooled to a temperature only about 3° C. higher than the initial temperature of the sea water employed as the scrubbing and cooling liquid. The sulfur dioxide in the crude gas may amount to as much as 0.3% by volume, and 90% thereof is removed in good scrubbing equipment now in use. The sea water enters the scrubber at a pH of 7.4 to 8.0, and is released at a pH of approximately 3 to 4. It is discharged overboard and is toxic to marine life.

The primary object of this invention is the provision of an inert gas system for a tanker or like vessel which avoids the production of toxic waste products.

With this object and others in view, as will hereinafter become apparent, the invention, in one of its more specific aspects, provides an improvement in the known method of flooding a container of a ship with an inert atmosphere by scrubbing a crude, sulfur dioxide bearing flue gas with a liquid capable of absorbing the sulfur dioxide from the flue gas, removing an entrained mist of the liquid from the scrubbed flue gas, and flooding the container with the scrubbed demisted flue gas.

The improvement contributed by this invention to the known method includes the step of contacting the crude flue gas in a scrubbing zone of the ship with an aqueous solution of sodium hydroxide or sodium carbonate of a strength sufficient to absorb substantially all the sulfur dioxide in the crude flue gas and to form a sodium sulfite solution therewith. The latter solution is thereafter contacted with atmospheric air in the afore-mentioned scrubbing zone until the sodium sulfite therein is substantially completely oxidized to sodium sulfate, whereupon the sodium sulfate solution is safely discharged overboard. Sodium sulfate is a normal ingredient of sea water and not toxic to marine life in the concentrations produced by discharge of the suitably diluted, oxidized liquor from a moving ship.

The washing tower employed for carrying out the method of this invention has two spacedly superimposed packed sections. Means are provided for alternatively supplying sulfur dioxide bearing flue gas and atmospheric oxygen to the bottom of the lower section. Cooling water is passed through one of the sections countercurrent to the ascending gas, and an alkaline aqueous solution is circulated through the other sections first during passage of flue gas through the tower, and thereafter during passage of atmospheric oxygen. The two gases so produced are separately discharged. A drain permits the sulfate solution ultimately produced to be discharged into the sea.

Other features, additional objects, and many of the attendant advantages of this invention will readily be appreciated as the invention is more fully understood from the following description of preferred embodiments when considered in connection with the appended drawing in which.

Figure 1:
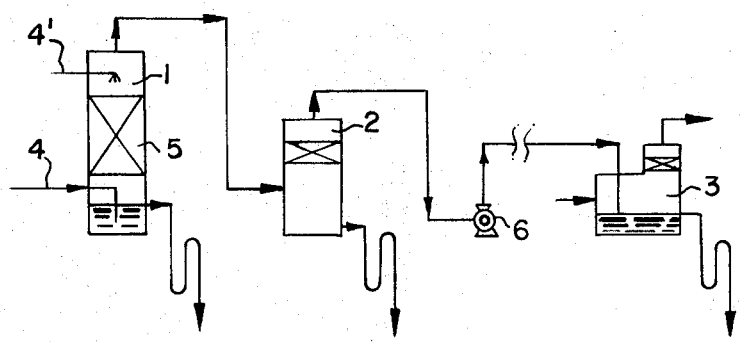
FIG. 1 illustrates the basic features of an installation for producing an inert gas from flue gas by means of conventional symbols in elevation.

Referring initially to FIG. 1, there are shown the basic elements common to known systems for producing an inert gas and to this invention. The system consists of a washing tower or column 1, a mist removing column 2 and a deck water seal 3. Flue gas is fed to the washing column 1 through a feed pipe 4 and passes a liquid seal at the bottom of the column. Washing liquid enters the top of the column 1 through a supply pipe 4' and makes contact with the ascending flue gas in a column section 5 packed with rings, saddles, or the like. The washed flue gas is drawn through the system by a fan 6 installed between the mist removing column 2 and the deck seal 3. The mist removing column has a dry packed section in which fine droplets entrained by the washed gas are caused to coalesce so that they collect at the bottom of the column 2 and may be drained overboard. In the deck seal, the purified flue gas passes through a body of continuously renewed sea water and is largely freed of entrained water droplets in a packed section analogous to that in the column 2 before being fed to oil containers for flooding the space above the oil level, as is well known and not shown in detail.

In the inert gas systems employed heretofore, sea water was sprayed on the packed column section 5 from the supply pipe 4', and the water, having absorbed most of the sulfur oxides in the flue gas, was discharged overboard. The gaseous effluent from the washing column contained enough residual sulfur dioxide to require the use of corrosion resistant material or linings in all portions of the system downstream from the column 1.

Figure 2:
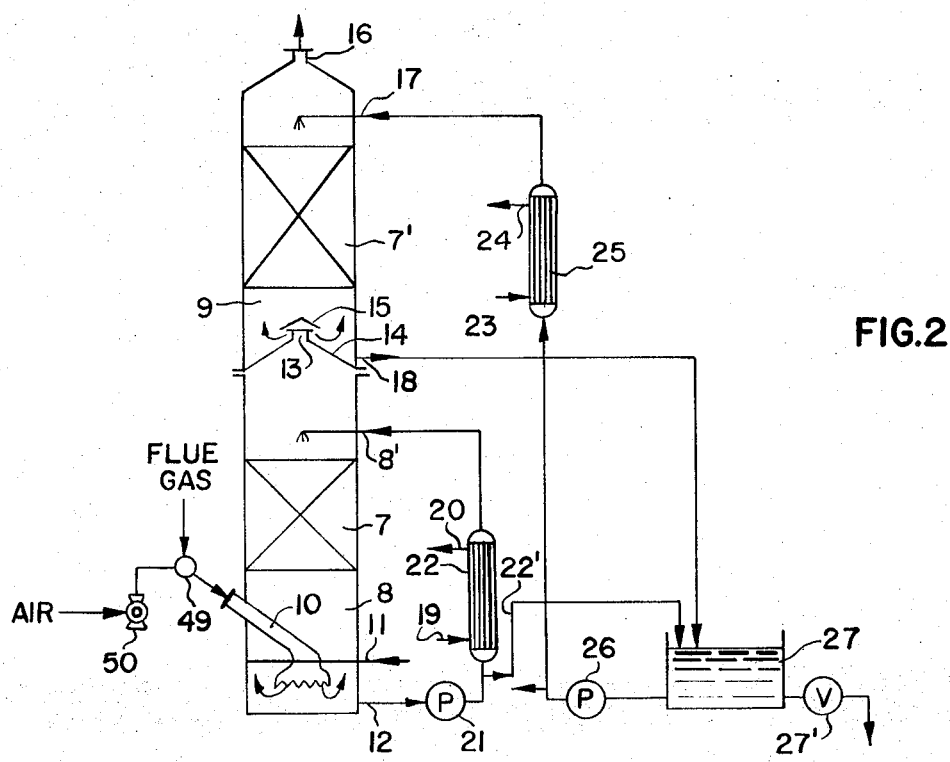
FIG. 2 illustrates the desulfurizing section of an installation of the invention of the type shown in FIG. 1.

A washing column of the invention and associated devices are illustrated in FIG. 2. It has a lower, cylindrical shell 8 flanged to a coaxial, cylindrical, upper shell 9. The axially central parts of the two shells 8, 9 are occupied by respective packed sections 7, 7' of Raschig rings, saddles, or the like, retained on perforated horizontal plates as is common practice in absorption columns and not shown in detail.

The bottom section of the lower shell 8 receives gas through a feed pipe 10 whose enlarged orifice is submersed in a pool of sea water. The level of the sea water pool is maintained by additions through a supply pipe 11, and its temperature is maintained by continuously withdrawing water from the pool through a discharge pipe 12. The withdrawn water is passed by a circulating pump 21 through a heat exchanger 22 which transmits much of the thermal energy of the crude flue gas to sea water admitted to the shell of the heat exchanger 22 through a pipe 19 and discharged through a pipe 20. The cooled liquid enters the top section of the shell 8 through a system of nozzles 8' and flows downward through the packed column section 7 countercurrent to the ascending flue gas which is thereby cooled and stripped of some sulfur dioxide and the small amount of sulfur trioxide which may be present in the crude gas.

The bottom plate 14 of the upper shell 9 is conical, and an aperture 13 at its apex is protected by a baffle 15 against entry of liquid from the upper shell 9 into the lower shell 8 while cooled and partly desulfurized flue gas can enter the bottom section of the upper shell 9 for further flow countercurrent to a washing liquor in the packed central section 7' of the shell 9 and is ultimately discharged from the washing column through an opening 16 in the conical cover of the shell 9. The washing liquor is admitted to the top section of the shell 9 through a spray nozzle 17, and discharged from an annular sump about the bottom plate 14 through a pipe 18 leading to a makeup tank 27 in which it is mixed with a strong solution of sodium hydroxide or sodium carbonate. The tank also may receive sea water from the circulating system of the lower shell 8 through a valved branch pipe 22' communicating with the discharge end of the pump 21, necessary control valves having been omitted from FIG. 2 since their location would be obvious to those skilled in the art.

The alkaline liquor is fed from the tank 27 to the nozzle 17 by a circulating pump 26 which drives the alkaline liquor through a second heat exchanger 25 whose shell has nipples 23, 24 for admission and discharge of cooling water drawn from the sea by a non-illustrated pump and returned to the sea after absorbing thermal energy from the circulating alkaline liquor.

While any adequate alkaline material may be dissolved in water in the make-up tank 27 to remove sulfur oxides from the flue gas at suitable temperatures and pressures in the shell 9, and many known bases suitable for forming sulfites with the $SO_2$ are non-toxic to marine life, considerations of economy limit the choice of alkaline material at this time to sodium hydroxide and sodium carbonate, the latter being peferred for its more convenient handling properties. When the crude flue gas is cooled in the shell 8 to a temperature well below the boiling point of the alkaline liquor, sulfur dioxide is stripped from the cooled gas as long as the liquor in the shell 9 remains alkaline. When the flue gas is cooled to a temperature of about 60° C. or less, the circulating alkaline liquor remains effective until it is practically completely neutralized by sulfur oxides.

The gas feed pipe 10 in the shell 8 is connected with the non-illustrated combustion chamber producing the flue gas by a two-way valve 49 which permits the pipe 10 to be provided alternatively with air drawn from the atmosphere by a compressor 50. When the liquor circulated between the tank 27 and the shell 9 approaches a condition of saturation with sulfur oxides, the valve 49 is switched to supply air from the compressor 50, and a two-way valve, not shown, but identical with the valve 49, connects the opening 16 to the atmosphere. No further sea water is admitted to the washing column through the supply pipe 11.

The sodium sulfite formed by reaction of $SO_2$ with the soduim hydroxide or sodium carbonate solution initially made up in the tank 27 is substantially completely converted to sodium sulfate by reaction with the countercurrent stream of air in the packed column section 7'. A non-toxic gas is released from the opening 16. The moisture discharged with the gas is made up by admitting contaminated water from the shell 8 to the tank 27 through the branch line 22', and the contents of the tank 27, consisting essentially of sodium sulfate dissolved in sea water, are drained overboard through a valve 27' connected to the tank 27 together with a stream of diluting sea water provided by a non-illustrated pump. The temperature in the oxidation zone in the column section 7' may be adjusted by heat exchange between the circulating liquor and cold sea water or steam in the second heat exchanger 25, as atmospheric conditions may warrant.

It is not normally necessary nor practical to flood oil containers with a continuous stream of inert gas, and the apparatus shown in FIG. 2 may be switched from absorption of sulfur oxides, mainly sulfur dioxide, to oxidation of sodium sulfite after flooding a container of known capacity, and the amount of sodium carbonate dissolved in sea water in the tank 27 may be chosen for full utilization of the alkaline material after producing the desired amount of inert gas. The concentration of the sodium carbonate or sodium hydroxide in the circulating alkaline liquor is not critical in itself, and the material is inexpensive enough to make precise stoichiometric calculations unnecessary.

Figure 3:
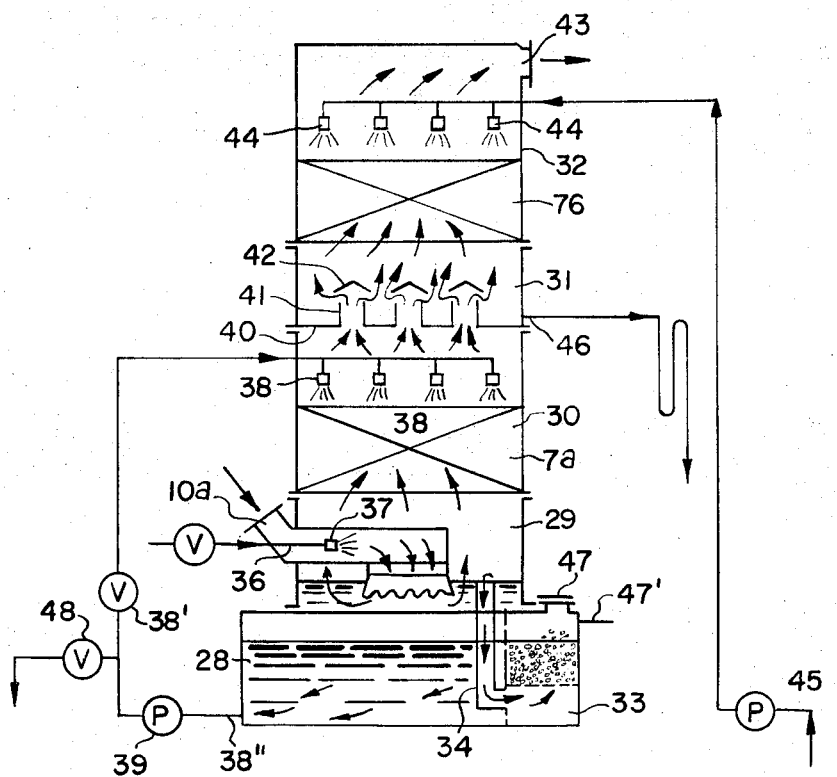
FIG. 3 shows another desulfurizing section of the invention in a view corresponding to that of FIG. 2.

While the shells 9 and 8 are coaxially superimposed and laterally offset from the tank 27, other spatial arrangements of the scrubbing zone and of the make-up tank in apparatus for performing the method of the invention may be resorted to, as is partly shown in the modified apparatus illustrated in FIG. 3, in which the make-up tank 28 forms the base of a tower further including sequentially superimposed, coaxial, cylindrical shells 29, 30, 31, and 32 of uniform diameter which are flanged to each other and the tank 28.

The tank 28 has a compartment 33 which is separated from the main portion of the tank cavity by a vertical perforated partition 35 whose perforations are chosen to substantially prevent passage of sodium carbonate crystals introduced into the compartment 33 through an opening in its cover normally closed by a cap 47, and supported in the compartment 33 by a screen similar to the partition 35. An overflow pipe 34 has an orifice in the compartment 33 under the supporting screen and another orifice in the shell 29 upwardly spaced from the cover of the tank 28 which constitutes the otherwise imperforate bottom of the shell 29. Sea water may be supplied to the compartment 33 through a pipe 47'.

A gas pipe 10a supplied with crude flue gas or air under pressure in the manner of the pipe 10 in FIG. 2, not again illustrated in FIG. 3, has a downwardly directed discharge orifice below the orifice of the overflow pipe 34. A valved line 36 supplies sea water from a non-illustrated pump or elevated tank to a spray nozzle 37 within the gas feed pipe 10a.

The tank 28 is connected with spray nozzles 38 in the top portion of the shell 30 by a line 38" equipped with a pump 39 and with valves 38', 48 which permit the output of the group to be either directed to the nozzles 38 or to be dumped overboard. A packed section 7a occupies the lower portion of the shell 30 and is analogous in structure and function to the sections 7, 7' described with reference to FIG. 2.

The bottom plate 40 of the shell 31 which upwardly bounds the cavity in the shell 30 is provided with openings from which short, wide pipes 41 extend upwardly, their upper orifices being each protected by a baffle 42 against downward passage of liquid through the plate 40.

The upper part of the shell 32 is normally connected to the mist removing column through a horizontally directed tube 43 and encloses spray nozzles 44 supplied with sea water under pressure by a pump 45. The nozzles 44 are directed against a packed column section 7b which occupies the lower part of the shell 32. The water passing from the nozzles 44 through the packed section 7b is collected on the imperforate portion of the bottom plate 40 and drained overboard by a pipe 46 whose intake orifice is below the common level of the upper orifices on the pipes 41.

The apparatus shown in FIG. 3 is operated as follows:

A sodium carbonate solution is initially made up in the tank 28 from sodium carbonate crystals in the compartment 33 and water from the pipe 37', and the dissolution of the crystals may be hastened, if desired, by circulating liquid from the main portion of the tank 28 through the nozzles 38, the packed section 7a, and the overflow pipe 34. Crude flue gas is thereafter admitted through the feed pipe 10a and is cooled to a temperature well below the boiling point of the alkaline liquor in the shell 29 by adiabatic evaporation of sea water injected into the stream of flue gas from the spray nozzle 37.

The cooled flue gas rises in the packed column section 7a countercurrent to descending sodium carbonate solution and is stripped of sulfur dioxide and of the small amount of sulfur trioxide which it may contain initially. The gas practically free of toxic ingredients is further cooled in the packed section 7b to a temperature not significantly higher than the temperature of the water supplied by the pump 45 through the nozzles 44. The desulfurized and cooled gas is further processed as described with reference to FIG. 1 and used for flooding a container aboard the ship.

The sodium carbonate solution in the tank 28 and the shells 30, 29 is continuously replenished with sodium carbonate supplied to the compartment 33 in the solid state. When the sulfite concentration of the circulating liquor becomes too high, or when an interruption in the supply of inert gas to the mist removing column is permissible, the feed pipe 10a is supplied with atmospheric air as illustrated in FIG. 2, and the pipe 43 is connected to the atmosphere by a non-illustrated two-way valve downstream from the fan 6, while the pump 39 is operated to move the sulfite bearing liquor countercurrent to the oxidizing air through the packed section 7a. The pump 45 may be stopped during the oxidation of the sodium sulfite to sodium sulfate, and the valves 38', 48 are ultimately reversed to pump the harmless contents of the tank 28 overboard, preferably after being diluted with much sea water admitted to the tank 28 through the line 47'. A new cycle may then be started.

The apparatus illustrated in FIG. 3 does not require the heat exchangers 22, 25 illustrated in FIG. 2 nor the associated piping and valves, and is normally preferred for this reason.

It will be appreciated that obviously needed control and shut-off valves have largely been omitted from FIG. 3 for the sake of simplicity. The valve admitting sea water to the spray nozzle 37 may be controlled automatically in a conventional manner according to the temperature of the gas discharged from the feed pipe 10a into the liquid seal at the bottom of the shell 29, and may additionally be shut off manually during the oxidation phase of tower operation.

The vertical array of component shells shown in FIG. 3 may be replaced partly or entirely by a system of horizontally juxtaposed vessels where the necessary head room is not available, and the required structural modifications of the components and their connections by pipes, additional pumps, and valves is too obvious to require more detailed description or illustration.

The shells 31, 32 and equipment located downstream in the inert gas system, as shown in FIG. 1, make contact only with a gas free from acidic components, and may therefore be constructed of mild steel or like, relatively inexpensive material without corrosion resistant liners.

It is a characteristic feature of both illustrated washing towers of the invention that they consist of flangedly, and therefore releasably connected components which are readily separated and connected for installation or maintenance.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the appended claims.

What is claimed is:

1. In a method of flooding a container of a ship with an inert atmosphere by scrubbing a crude, sulfur dioxide bearing flue gas with a liquid capable of stripping said sulfur dioxide from said flue gas, removing an entrained mist of said liquid from the scrubbed flue gas, and flooding said container with the scrubbed, demisted flue gas, the improvement in said scrubbing which comprises:

(a) contacting said crude flue gas in a scrubbing zone on said ship with an aqueous solution essentially consisting of water and sodium hydroxide or sodium carbonate of a concentration sufficient to absorb substantially all the sulfur dioxide in said flue gas and to form a sodium sulfite solution therewith;

(b) thereafter contacting said sodium sulfite solution in said scrubbing zone with atmospheric oxygen until the sodium sulfite in said solution is substantially completely oxidized to sodium sulfate; and (c) discharging the resulting sodium sulfate solution overboard.

2. In a method as set forth in claim 1, cooling said flue gas prior to said contacting thereof with said aqueous solution to a temperature below the boiling point of said aqueous solution.

3. In a method as set forth in claim 2, cooling said flue gas to said temperature prior to said contacting by dispersing water in a stream of said flue gas at a rate sufficient to evaporate said water, and to cool said flue gas by the heat of evaporation of the water.

4. In a method as set forth in claim 2, cooling said flue gas prior to said contacting by countercurrent washing with water, and mixing said water with said aqueous solution.

5. In a method as set forth in claim 2, further cooling said flue gas by withdrawing thermal energy from said aqueous solution by heat exchange with water prior to said contacting of the aqueous solution with said flue gas.

6. In a method as set forth in claim 2, further cooling said flue gas after said contacting by washing the flue gas when substantially free from sulfur dioxide with water, and discharging said water overboard.

7. In a method as set forth in claim 1, said water being sea water.

8. In a method as set forth in claim 1, said zone being constituted by a packed section of a scrubbing column.

References Cited
UNITED STATES PATENTS
3,389,829   6/1968   Stanford _____ 423—242
3,431,072   3/1969   Rozip et al. _____ 423—551

EARL C. THOMAS, Primary Examiner
G. A. HELLER, Assistant Examiner

U.S. Cl. X.R.
220—88 B